Figure 5:
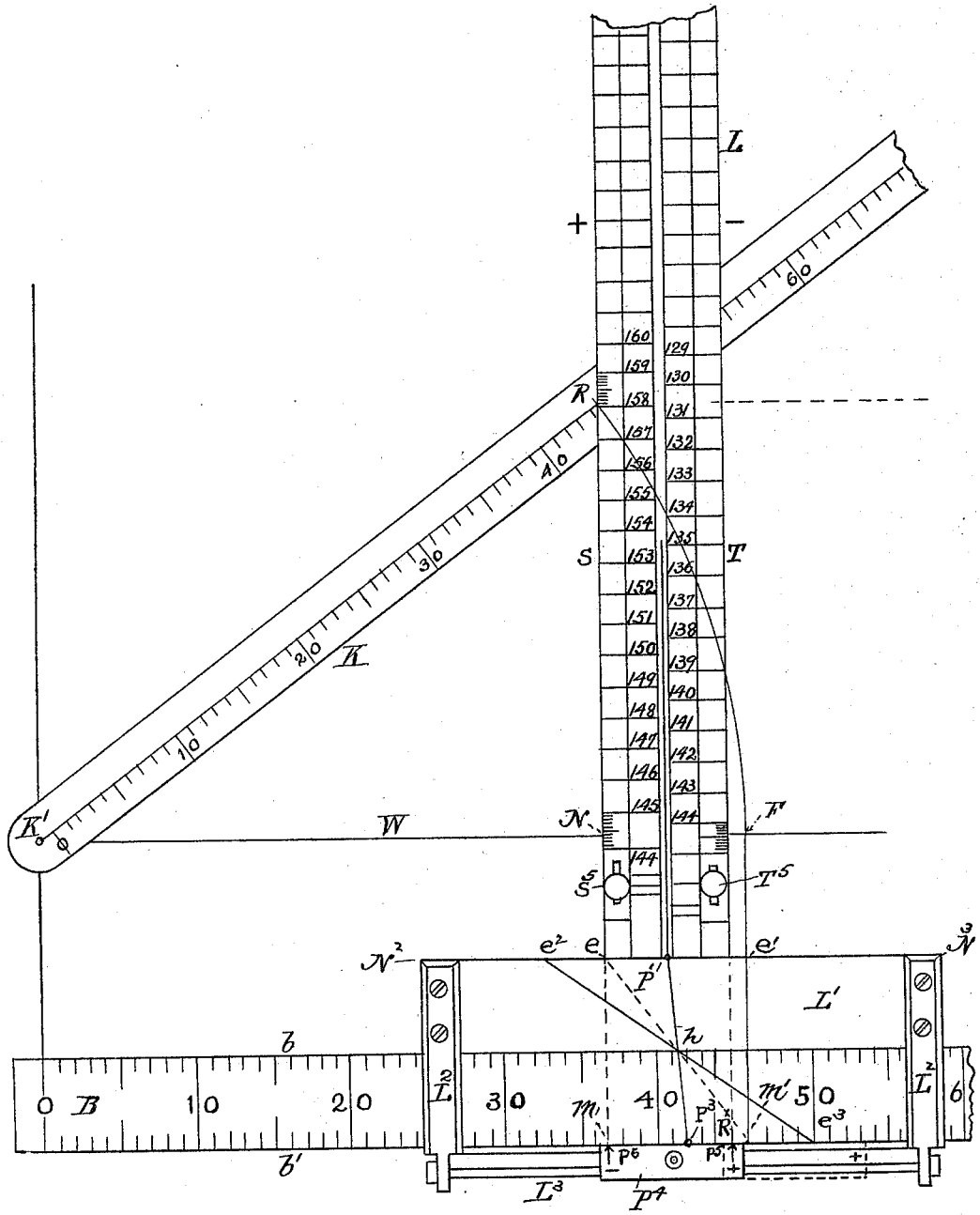

(No Model.) 2 Sheets—Sheet 1.
W. H. FOSS.
CALCULATING APPARATUS.
No. 585,336. Patented June 29, 1897.
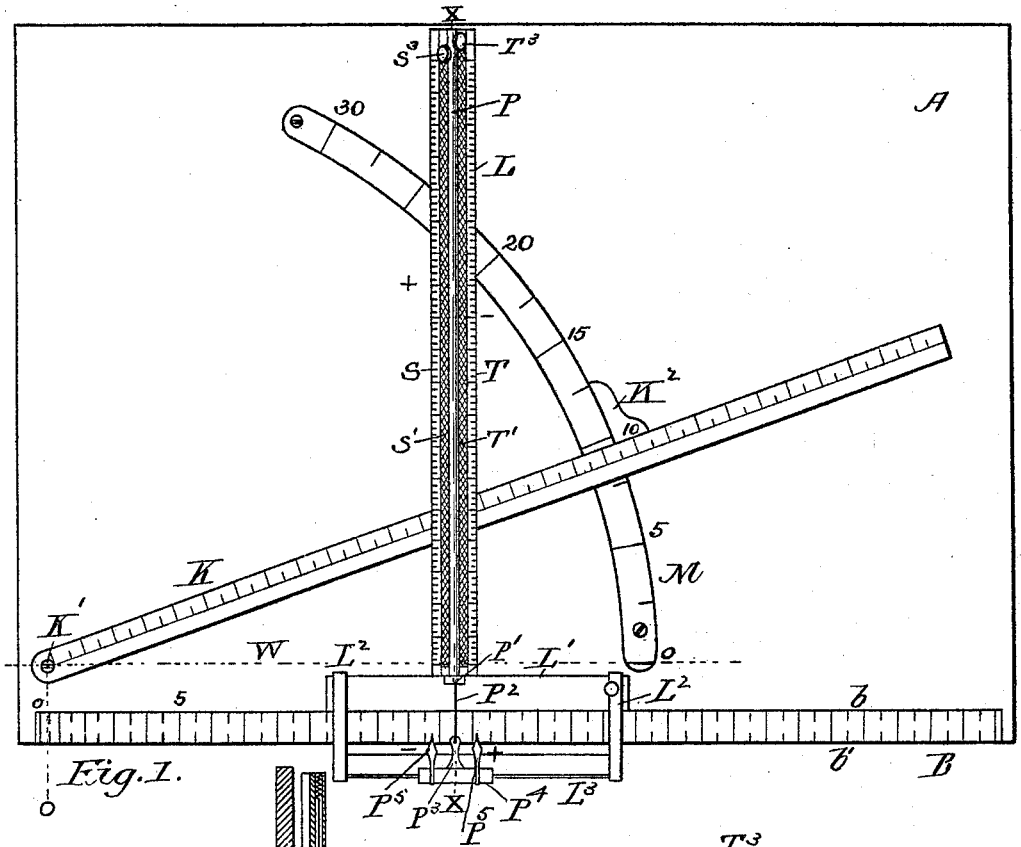
Fig. 1.
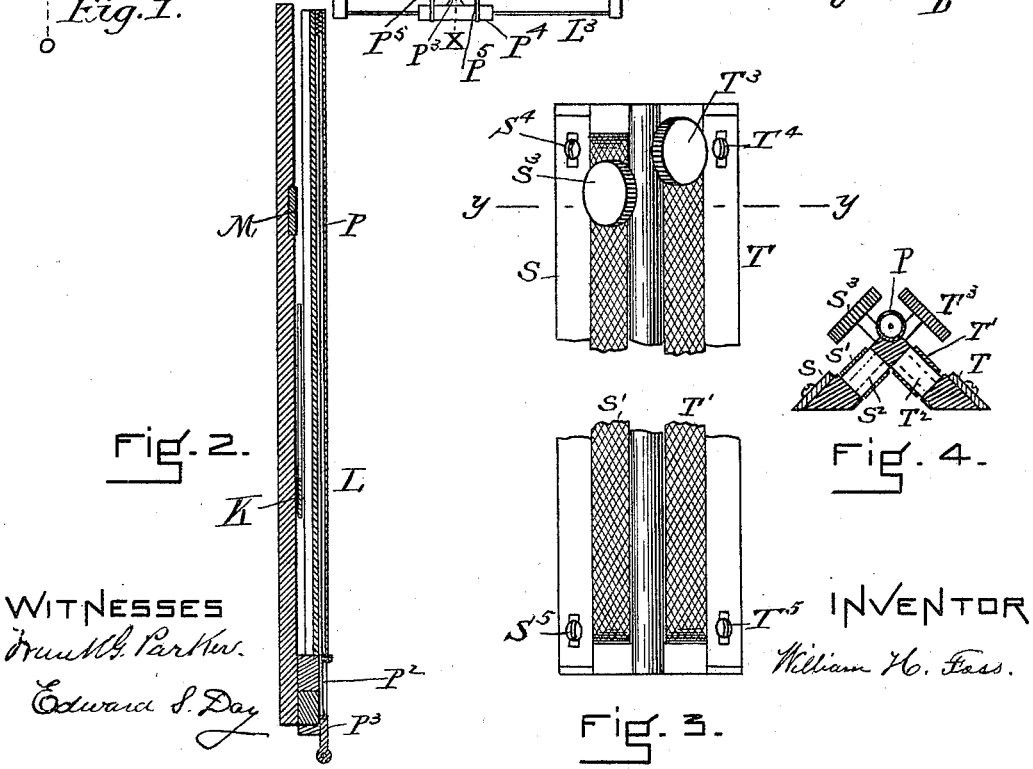
Fig. 2.
Fig. 3.
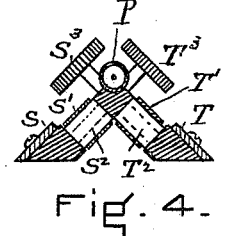
Fig. 4.
WITNESSES
Frank G. Parker.
Edward S. Day
INVENTOR
William H. Foss.

UNITED STATES PATENT OFFICE.

WILLIAM H. FOSS, OF BOSTON, MASSACHUSETTS.

CALCULATING APPARATUS.

SPECIFICATION forming part of Letters Patent No. 585,336, dated June 29, 1897.

Application filed May 8, 1896. Serial No. 590,764. (No model.)

*To all whom it may concern:*

Be it known that I, WILLIAM H. FOSS, of Boston, in the county of Suffolk and State of Massachusetts, have invented a new and useful Improvement in Gonic Stadia Calculating Apparatus, of which the following, taken in connection with the accompanying drawings, is a specification.

My invention relates to an apparatus by which horizontal and vertical equivalents may be deduced without the aid of calculations from gonic stadia measurements, the object being to avoid mental work and also to secure rapidity and accuracy.

Before describing the apparatus I will briefly review the ordinary gonic stadia method of measurement and the manner of reduction.

The instrument used is a theodolite, or, if a transit, one that has a vertical graduated circle, and in either instrument the so-called "stadia-wires" must be present, as well as the ordinary horizontal and vertical cross wires. With an instrument of this class the user, having a fixed point and height above base, with the aid of his assistant and a stadia-rod, reads the angle of inclination and the length of the portion of the stadia-rod included between the stadia-wires of his instrument. Having the angle of inclination to the point which is to be located and the length of the intercepted portion of the stadia-rod held at the same point, the horizontal and vertical distances to the point are to be determined. Heretofore these data have been calculated by well-known trigonometrical formulas or by diagrams and tables.

The object of my invention is to determine these data, and also to obtain at once the elevation of the observed point above an assumed base, by means of fixed and swinging scales and a graduated arc, all combined in a single apparatus.

The apparatus is illustrated in the accompanying drawings, in which—

Figure 1 shows the apparatus in plan. Fig. 2 is a section taken on line X X of Fig. 1. Fig. 3 shows in elevation parts of the vertical scale. Fig. 4 is a cross-section taken on line $y\ y$ of Fig. 3. Fig. 5 is an enlargement of a portion of the vertical device L and the reading-lines $b$, $b'$, and K. The letters are the same as on plan, Fig. 1, except where new ones are required.

In the drawings, Fig. 1, A represents a baseboard made of any suitable material and having fixed to its lower border a bar B, which has attached to it a scale-piece, upon both edges of which is a graduated scale indicating feet or meters. These edges or reading-lines are indicated by $b$ and $b'$, Fig. 1. The base A has also affixed to it, by a pivot at K', a swinging arm K. This swinging arm is graduated with the same divisions that are upon the scales on the scale-bar B; but the zero-point on the arm is in advance of the zero-point on the fixed scales $b\ b'$, as shown in Fig. 1. This advance of the zero-point is made as a method of correcting the constant error made in measuring by stadia-wires that is due to the fact that the intersection of the visual lines is not at the center of the instrument, but at a point in advance—that is, toward the object. As this correction varies with different instruments, the graduation-marks are made on a movable strip adjustably attached to the swinging arm K. The swinging arm K has firmly attached to it a vernier $K^2$, graduated in the usual manner and adapted to move with the swinging arm along the graduated arc M. The graduations and numbers on the arc M are so arranged that when the arm K is set so that the reading of the vernier is the same as the observed angle the angle which the arm K makes with the scale $b$ is twice the observed angle. The size of the graduations on the arc M is made double the size of ordinary graduations to the same radius.

The vertical device L, carrying the two scales S and T, Fig. 3, is attached to a sliding base-piece L', which is free to move along the scale-bar B and is so adjusted that the scales S and T will always be perpendicular to the scale-bar B. The base-piece L' is held to the scale-bar B by the clamping-pieces $L^2$ $L^2$. The vertical scales S and T are graduated just alike, and the unit divisions on them are twice as long as the unit divisions on the scales $b$, $b'$, and K. The unit divisions on the scales S and T are subdivided to tenths of a unit division. The scales can be adjusted by means of the small clamp-screws $S^4 T^4$ and $S^5 T^5$ at either end of the scales, as shown on Fig. 3, so that any one of these tenth divisions of the first unit division may be made to coincide with the line W, passing through the point K' and the zero-point of the arc M. Slots cut in the scales allow them to move back and forth a sufficient distance. There are no numbers on the scales S and T to designate the divisions, the numbering being done by two movable belt-ribbons S' T', passing over small rollers $S^2 T^2$, Fig. 4, located at either end of the scales and runnning close to and parallel with said scales S and T. On the upper surface of these ribbons are numbers of any desired range. The rollers at the lower end of the scales are not shown, as they are the same as those indicated by $S^2$ and $T^2$ at the top of the scales, Fig. 4. The rollers $S^2$ and $T^2$ can be turned by means of the finger-wheels $S^3$ and $T^3$, so that the belt-ribbons can be moved in either direction and thereby cause any desired number to stand at any desired unit division of the scale S or T.

The reading-wire $P^2$ is an arrangement for the purpose of locating a point on the reading-line of the scale $b$, which point indicates the reading of that scale to express the correct horizontal distance. It is attached to a flexible spring fixed within a tube P, said tube being located midway between the two belt-ribbons S' and T'. The spring is for the purpose of keeping the reading-wire at a proper tension. The reading-wire $P^2$ passes through a small eyehole at P'. This eyehole is at a distance from the reading-line of the scale $b$ equal to the distance between the reading-lines of the scales $b$ an $b'$. After passing through said eyehole the end of the wire is attached near the center $P^3$ of a slide $P^4$. The slide $P^4$ moves on a spindle attached to the clamping-pieces $L^2 L^2$. On either side of the point $P^3$ are indexes $P^5 P^6$ at unequal distances from the point $P^3$, the distances depending upon the distance apart of the edges of the scales S and T and the constant correction mentioned on page 3.

The apparatus, the several parts of which have been described, mechanically solves the two formulas $$H = \frac{R+C}{2} + \frac{R+C}{2} \cos. 2n \quad (1)$$

and $$E = \frac{R+C}{2} \sin. 2n, \quad (2)$$

in which H equals the horizontal distance from the center of instrument to the observed point. E equals the difference in elevation between the observed point and the station occupied. R equals the length of the intercepted portion of the stadia-rod multiplied by the instrument ratio. C equals a correction depending upon the instrument used to be added to R. $n$ equals the observed angle of elevation or depression.

The usually accepted formulas for reducing stadia observations are $$H = R \cos.^2 n + C \cos. n = \frac{R}{2} + \frac{R}{2} \cos. 2n + C \cos. n \quad (3)$$

for horizontal distances and $$E = \frac{R}{2} \sin. 2n + C \sin. n \quad (4)$$

for the difference in elevation.

The formulas 1 and 2 are obtained from 3 and 4 by making an arbitrary change in both by adding the constant C to R and neglecting the term "C cos. $n$" in formula 3 and "C sin. $n$" in formula 4. The error introduced in the result by making this change can safely be neglected in this kind of work. The following table shows the amount of error made in horizontal and vertical distances for every five degrees up to twenty-five degrees by using formulas 1 and 2 instead of 3 and 4. The error made depends wholly upon the angle of inclination and the correction C and is independent of the observed distance.

Data:  R = 200.0 feet.
       C =   1.25 feet.

| Angle of inclination. | Horizontal distance. | | Elevation. | | Error made. | |
|---|---|---|---|---|---|---|
| | (3) formula. | (1) formula. | (4) formula. | (2) formula. | Horizontal distance, columns 2 and 3. | Elevation, columns 4 and 5. |
| 1 | 2 | 3 | 4 | 5 | 6 | 7 |
| 5° | 199.73 | 199.72 | 17.47 | 17.47 | 0.01 | 0.00 |
| 10° | 195.20 | 195.18 | 34.42 | 34.42 | 0.02 | 0.00 |
| 15° | 187.81 | 187.77 | 50.32 | 50.31 | 0.04 | 0.01 |
| 20° | 177.78 | 177.71 | 64.71 | 64.68 | 0.07 | 0.03 |
| 25° | 165.41 | 165.31 | 77.13 | 77.08 | 0.10 | 0.05 |

To simplify the writing of the formulas 1 and 2, make R+C=D. Then R will always stand for the observed distance, as determined by the rod reading, and D the total distance from the center of the instrument after the correction C has been added. Formulas 1 and 2 will hereinafter be written when referred to in the form $$H = \frac{D}{2} + \frac{D}{2} \cos. 2n \quad (5)$$

$$E = \frac{D}{2} \sin. 2n. \quad (6)$$

There are three things to be proved in order to show that the apparatus does mechanically and correctly solve the two formulas 5 and 6. First, that the point on the reading-line $b$, at which the correct horizontal distance H must be read, is the perpendicular projection on the reading-line $b$ of the middle point of the versed sine of the angle 2 $n$ to the radius (R+C)=D; second, that the reading-wire $P^2$ is so adjusted to the slide $P^4$ and the indexes are so placed on this slide that if the indexes are made to coincide with the same division on the reading-line $b'$ as that at which the reading-line S or T is set on the reading-line K the wire will cut the reading-line $b$ at a point which is the perpendicular projection on the reading-line $b$ of the middle point of the versed sine of the angle $2\,n$; third, that the unit divisions on the vertical reading-lines S and T must be twice as long as those on the reading-lines $b$, $b'$, and K.

First. In the diagram Fig. 5, K′ R = D, K′ F is also equal to D, and the angle R K′ F is equal to $2\,n$. The distance K′ N from K′ to the intersection of the perpendicular reading-line S with the line W is equal to D cos. $2\,n$, and therefore D − D cos. $2\,n$, or D (1 − cos. $2\,n$) is equal to N F, which is the versed sine of the angle $2\,n$ to radius D. Now $$\frac{D}{2} + \frac{D}{2} \cos. 2\,n = D \cos. 2\,n + D\,\frac{(1-\cos.\,2\,n)}{2},$$

and since the first member of this equation is the expression for H, we can write $$H = D \cos. 2\,n + D\,\frac{(1-\cos.\,2\,n)}{2}.$$

The second term of the second member of this equation is the correct expression for the versed sine N F for the angle $2\,n$ to radius D. Letting N F = V, the equation can be reduced to $$H = D \cos. 2\,n + \frac{V}{2},$$

which proves that the correct horizontal distance must be estimated from the point K′ to the middle of the versed sine N F = V.

Second. On the point K′ as a center and with radius R + C = D, R being the number on the reading-line K to which the reading-line S is placed and C the distance from the point K′ to the zero-point of the reading-line K, describe the arc R F, intersecting the line W at F. The line $N^2 N^3$ on the base-piece L′ of the vertical device L, on which the eyehole P′ is located, is parallel to the reading-line $b$ and at a distance from it equal to that between the reading-lines $b$ and $b'$. Draw perpendiculars from the two extremities of the versed sine N F to the reading-line $b'$, intersecting it at the points $m$ and $m'$, also the line $N^2 N^3$ at $e$ and $e'$; also, from the middle point of the versed sine N F draw a perpendicular to the reading-line $b$, intersecting it at the point $h$. Now since the distances $e\,e'$ and $m\,m'$ are equal and also equal to the versed sine N F, and the lines $N^2 N^3$, $b$ and $b'$ are parallel, if a reading-wire be drawn from $e$ to $m'$ it will bisect the projection of the versed sine N F upon the reading-line $b$ at the point $h$ and indicate on the reading-line $b$ the correct horizontal distance. If the end of the reading-wire at $e$ be moved to the right and made to coincide with the eyehole P′, midway between the reading-lines S and T, and the end at $m'$ be moved to the left the same distance to the point $P^3$, the wire will still pass through the point $h$ and bisect the versed sine distance N F as before. Make the end of the wire fast at $P^3$ to the slide $P^4$ and draw the wire through the eyehole P′ and make it fast to the spring in the tube P. On the slide place an index $P^5$ to coincide with the number R′ on the reading-line $b'$ the same as that to which the reading-line S is placed on the reading-line K. Call the distance between the reading-lines S and T $d$, then the distance from $P^3$ to $m'$ is $\frac{d}{2}$, because this was the distance moved to the left. The distance from R′ to $m'$ is C. Therefore the distance from $P^3$, at which to make the wire fast to the slide, is $\frac{d}{2} - C$. Now move the vertical device L to the left until the reading-line T coincides with the same number R on the reading-line K′ to which S was set. Then the eyehole P′, with the wire, will have moved to the left the distance $d$ to the point $e^2$, and the point $P^3$ must now be moved in the opposite direction or to the right the same distance $d$ to the point $e^3$ in order to cause the reading-wire to pass through the point $h$. The distance from the position of $P^3$ at $e^3$ to the number R′, at which the index should be placed, is $$d - \left(\frac{d}{2} - C\right) = d - \frac{d}{2} + C = \frac{d}{2} + C;$$

that is, the distance to the right of the fixed end of the wire at which to place the index for the reading-line S is equal to half the distance between the reading-lines S and T, minus the correction C, and the distance to the left at which to fix the index for the reading-line T is half the distance between S and T, plus the correction C.

It will be observed that for any given distance and angle of inclination the reduced horizontal distance should be the same for either reading-line S or T, so that the reading-wire ought to indicate the same horizontal distance on the reading-line $b$ in either position of the vertical device L.

Third. The expression for the correct elevation to be read from the reading-lines S and T is $$E = \frac{D}{2} \sin. 2\,n;$$

but we see from the diagram that the distance N R, expressed in units of D, is equal to D sin. $2\,n$ — a result twice too large. If the units of distance on the reading-lines S and T are made twice as long as those on the reading-lines $b$, $b'$, and K, the numerical expression for the elevations will always be correctly given.

It remains to be proved that the elevations of the observed point above an assumed base can be obtained at once from the apparatus.

The scales S and T can be adjusted so that any tenth division of the first unit division of either may be made to coincide with the line W. The belt-ribbons S' and T' can be turned until any desired number is brought opposite the first graduation-mark on the scales S or T, respectively. The numbers on the ribbon S', which is used for angles of elevation, read up, and those on the ribbon T', which is used for angles of depression, read in the opposite direction. The scale S and belt-ribbon S' and the scale T and belt-ribbon T' can therefore be set so that the reading of the scales S and T, respectively, at the point formed by the intersection of the line W with the reading-line S or T will be the same as the elevation of the station occupied. It has already been shown that the distance from the line W to the point where the reading-line K cuts the reading-line S or T is the correct difference in elevation between the station occupied and the observed point.

As the numbers on the belt-ribbon S' or T' are consecutive, it is evident that for any given angle the reading on the scale S at the intersection with the line K will be equal to the elevation of the station occupied plus the difference of elevation, and the reading on the scale T at the intersection with the line K will be equal to the elevation of the station occupied minus the difference of elevation.

The operations of the apparatus will be explained by means of a practical example. Suppose the observed angle of elevation or depression to be eighteen degrees twenty-six minutes and the rod reading to indicate a distance of forty-five feet. Set the vernier $K^2$, Fig. 1, on the arc M so that the reading will be eighteen degrees twenty-six minutes. Then the real angle between the reading-line K and the line W will be thirty-six degrees fifty-two minutes or $2n$, as required. Suppose the elevation of the station occupied to be 144.4 feet above base. Now to adjust the scale S for this elevation make the ".4" graduation of the first unit interval on scale S, reading up, coincide with the line W. Move the belt-ribbon S' by means of the finger-wheel $S^3$ until the number "144." is opposite the first graduation-mark of scale S, as shown on Fig. 5, and the scale S is numbered for angles of elevations for this particular station.

The adjustment of scale T for angles of depression is the same as that for scale S, only, as the numbering on the belt-ribbon T' is in an opposite direction to that on the belt-ribbon S', the .4 graduation of the lower unit interval of the scale T, reading down, would be placed on the line W. To number the scale, the finger-wheel $T^3$ would be turned until the number "144" coincided with the first unit graduation above the line W. Thus adjusted, both scales would indicate the same elevation of the line W when read in their respective directions. Move the vertical device L until the reading-line S coincides with the reading-line K at the number "45," which is the observed distance, and the correct elevation of the observed point above the assumed base can be correctly read, which, as shown by Fig. 5, is 158.2. To obtain the horizontal distance, the slide L' is moved until the index $P^5$, Fig. 5, coincides on the reading-line b' with the number "45," and the reading-wire will cut the reading-line b at h, indicating the reading 41.41, which is the correct horizontal distance.

If the angle is one of depression, the vertical device L is moved until the reading-line T coincides with the number "45" on the reading-line K, and the correct elevation of the point is read from scale T, which would be 130.6. (See Fig. 5.) To obtain the horizontal distance, the slide L' is moved until the index $P^6$, Fig. 5, coincides on the reading-line b' with the number "45," and the reading-wire will cut the reading-line b at h, indicating the reading 41 41, the same as when scale S was used.

I claim—

1. In a gonic stadia calculating apparatus the combination of a base, a fixed horizontal scale upon one border of said base, a graduated arc also fixed to said base, and a swinging scale pivoted at the center of the circle of the graduated arc; with a scale standing at right angles to the fixed horizontal scale and adapted to slide along said horizontal scale, always remaining at right angles to the same, and having a device for indicating the position of the said vertical scale in relation to the horizontal scale substantially as and for the purpose set forth.

2. In a gonic stadia calculating apparatus, a moving vertical scale device L, having upon each edge an adjustable scale adapted to operate as described, a device for indicating the position of the vertical scale on the horizontal scale, a horizontal scale, a swinging scale and a graduated arc, substantially as and for the purpose set forth.

3. In a gonic stadia calculating apparatus a vertical scale device L adapted to be moved along a horizontal scale, and having adjustable scales attached to each of its edges, and belt-ribbons having indicating numbers upon them and adapted to be set in reading proximity to the said scales, substantially as and for the purpose set forth.

4. In a gonic stadia calculating apparatus, a vertical scale device L as described with a reading-wire $P^2$, slide $P^4$, and horizontal scale, substantially as and for the purpose set forth.

In testimony whereof I have signed my name to this specification, in the presence of two subscribing witnesses, on this 31st day of March, A. D. 1896.

WILLIAM H. FOSS.

Witnesses:
ALBERT L. GREEN,
JATT GRANT.